United States Patent
Kraft et al.

(10) Patent No.: US 6,857,271 B2
(45) Date of Patent: Feb. 22, 2005

(54) SECONDARY FUEL NOZZLE WITH READILY CUSTOMIZABLE PILOT FUEL FLOW RATE

(75) Inventors: Robert J. Kraft, Palm City, FL (US); Alfredo Cires, Palm Beach Gardens, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 10/320,990

(22) Filed: Dec. 16, 2002

(65) Prior Publication Data

US 2004/0123597 A1 Jul. 1, 2004

(51) Int. Cl.[7] .............................. F23R 3/14; F23R 3/28; F02C 7/22
(52) U.S. Cl. ............................ 60/737; 60/748; 239/399
(58) Field of Search .......................... 60/737, 740, 746, 60/747, 748; 239/399–406

(56) References Cited

U.S. PATENT DOCUMENTS

| | | | | |
|---|---|---|---|---|
| 2,945,629 A | * | 7/1960 | Chute et al. ................... | 60/740 |
| 3,095,153 A | * | 6/1963 | Soth ............................. | 60/741 |
| 3,240,433 A | * | 3/1966 | Keating ....................... | 239/400 |
| 3,739,989 A | * | 6/1973 | Vosper ........................ | 239/399 |
| 3,763,650 A | * | 10/1973 | Hussey et al. ................ | 60/737 |
| 3,930,369 A | * | 1/1976 | Verdouw ...................... | 60/737 |
| 3,958,416 A | * | 5/1976 | Hammond et al. ........... | 60/737 |
| 4,982,570 A | | 1/1991 | Waslo et al. | |
| 5,156,002 A | * | 10/1992 | Mowill ......................... | 60/738 |
| 5,199,265 A | | 4/1993 | Borkowicz | |
| 6,178,752 B1 | * | 1/2001 | Morford ....................... | 60/737 |
| 6,282,904 B1 | | 9/2001 | Kraft et al. | |
| 6,446,439 B1 | | 9/2002 | Kraft et al. | |
| 6,609,376 B2 | * | 8/2003 | Rokke .......................... | 60/737 |

* cited by examiner

*Primary Examiner*—Ted Kim
(74) *Attorney, Agent, or Firm*—Brian R. Mack

(57) ABSTRACT

An improved secondary fuel distribution system having a readily adjustable premix pilot nozzle for use in a gas turbine combustor is disclosed. The secondary fuel nozzle assembly has a premix fuel nozzle comprising an annular tubular manifold and a premix pilot nozzle. Multiple embodiments of premix pilot nozzles are disclosed that have a fuel flow rate that can be controlled and adjusted as required, including a plate and feed hole combination, a pressfit premix pilot nozzle, and a premix pilot nozzle that is threaded into the secondary fuel nozzle assembly.

8 Claims, 6 Drawing Sheets

SECONDARY FUEL NOZZLE WITH READILY CUSTOMIZABLE PILOT FUEL FLOW RATE

BACKGROUND OF THE INVENTION

1. Field of the Invention

This invention relates generally to a fuel nozzle for use in a gas turbine combustor and more specifically to a fuel nozzle having a premix pilot circuit that can be adjusted or modified to meet a desired flow rate.

2. Description of Related Art

The U.S. Government has enacted requirements for lowering pollution emissions from gas turbine combustion engines, especially nitrogen oxide (NOx) and carbon monoxide CO. These emissions are of particular concern for land based gas turbine engines that are used to generate electricity since these types of engines usually operate continuously and therefore emit steady amounts of NOx and CO. A variety of measures have been taken to reduce NOx and CO emissions including the use of catalysts, burning cleaner fuels such as natural gas, and improving combustion system efficiency. One of the more significant enhancements to land based gas turbine combustion technology has been the use of premixing fuel and compressed air prior to combustion. An example of this technology is shown in FIG. 1 and discussed further in U.S. Pat. No. 4,292,801. FIG. 1 shows a dual stage dual mode combustor typically used in a gas turbine engine for generating electricity. Combustor 12 has first stage combustion chamber 25 and a second stage combustion chamber 26 interconnected by a throat region 27, as well as a plurality of diffusion type fuel nozzles 29. Depending on the mode of operation, combustion may occur in first stage combustion chamber 25, second stage combustion chamber 26, or both chambers. When combustion occurs in second chamber 26, the fuel injected from nozzles 29 mixes with air in chamber 25 prior to ignition in second chamber 26. As shown in FIG. 1, an identical fuel nozzle 29 is positioned proximate throat region 27 to aid in supporting combustion for second chamber 26. While the overall premixing effect in first chamber 25 serves to reduce NOx and CO emissions from this type combustor, further enhancements have been made to the centermost fuel nozzle since fuel and air from this fuel nozzle undergo minimal mixing prior to combustion.

A combined diffusion and premix fuel nozzle replaced the diffusion type fuel nozzle shown proximate throat region 27 in FIG. 1. Although an improvement, this nozzle still contained a diffusion fuel circuit that contributed to elevated levels of NOx and CO emissions. As a result, this fuel nozzle was modified such that all fuel that was injected into a combustor was premixed with compressed air prior to combustion to create a more homogeneous fuel/air mixture that would burn more completely and thereby result in lower emissions. This improved fully premixed fuel nozzle is shown in FIG. 2 and discussed further in U.S. Pat. No. 6,446,439. Fuel nozzle 50 contains a generally annular premix nozzle 51 having a plurality of injector holes 52 and a premix pilot nozzle 53 with a plurality of feed holes 54. In this embodiment, fuel enters a premix passage 55 from premix pilot nozzle 53 and mixes with air from air flow channels 56 to form a premixture. Fuel nozzle 50 is typically utilized along the centerline of a combustor similar to that shown in FIG. 1 and aids combustion in second chamber 26.

Although the fully premixed fuel nozzle disclosed in FIG. 2 provides a more homogeneous fuel/air mixture prior to combustion than prior art fuel nozzles, disadvantages to the fully premixed fuel nozzle have been discovered, specifically relating to premix pilot nozzle 53. Depending on the base load operating conditions, compressor air flow, and other factors, the amount of fuel required to be injected through holes 52 and 54 will vary from engine to engine, and therefore, producing a common fuel nozzle for different engines is not possible. This is especially a disadvantage with respect to premix pilot nozzle 53, for which feed holes 54 must be machined prior to assembly of fuel nozzle 50, since feed holes 54 are inaccessible once premix pilot nozzle 53 is installed in fuel nozzle 50. Therefore, it is necessary to know fuel flow requirements of the fuel nozzle for each engine before fuel nozzle assembly 50 is assembled. As a result, this prohibits the storage of completed fuel nozzle assemblies for a wide variety of engines. Furthermore, having individual or "custom" flowing fuel nozzle designs prevents the engine operator from interchanging fuel nozzles between different flowing engines. In addition, from the manufacturer's perspective, it would be advantageous to have a uniform design assembled, which can be shipped to an engine operator on short notice. Therefore, what is desired, and is disclosed in the present invention, is a fully premixed fuel nozzle for a combustor, which can be fine-tuned through an interchangeable or adjustable premix pilot nozzle. A variety of alternate embodiments of the present invention are disclosed in detail.

SUMMARY AND OBJECTS OF THE INVENTION

It is an object of the present invention to provide a fully premixed secondary fuel nozzle assembly having a premix pilot nozzle with a means for regulating the amount of fuel to the pilot nozzle.

It is a further object of the present invention to provide a fully premixed secondary fuel nozzle assembly in which the regulated fuel flow to a premix pilot nozzle can be adjusted.

It is yet another object of the present invention to provide a fully premixed secondary fuel nozzle assembly in which the premix pilot nozzle is removable.

In accordance with these and other objects, which will become apparent hereinafter, the instant invention will now be described with particular reference to the accompanying drawings.

DETAILED DESCRIPTION OF THE PREFERRED EMBODIMENT

Figure 1:
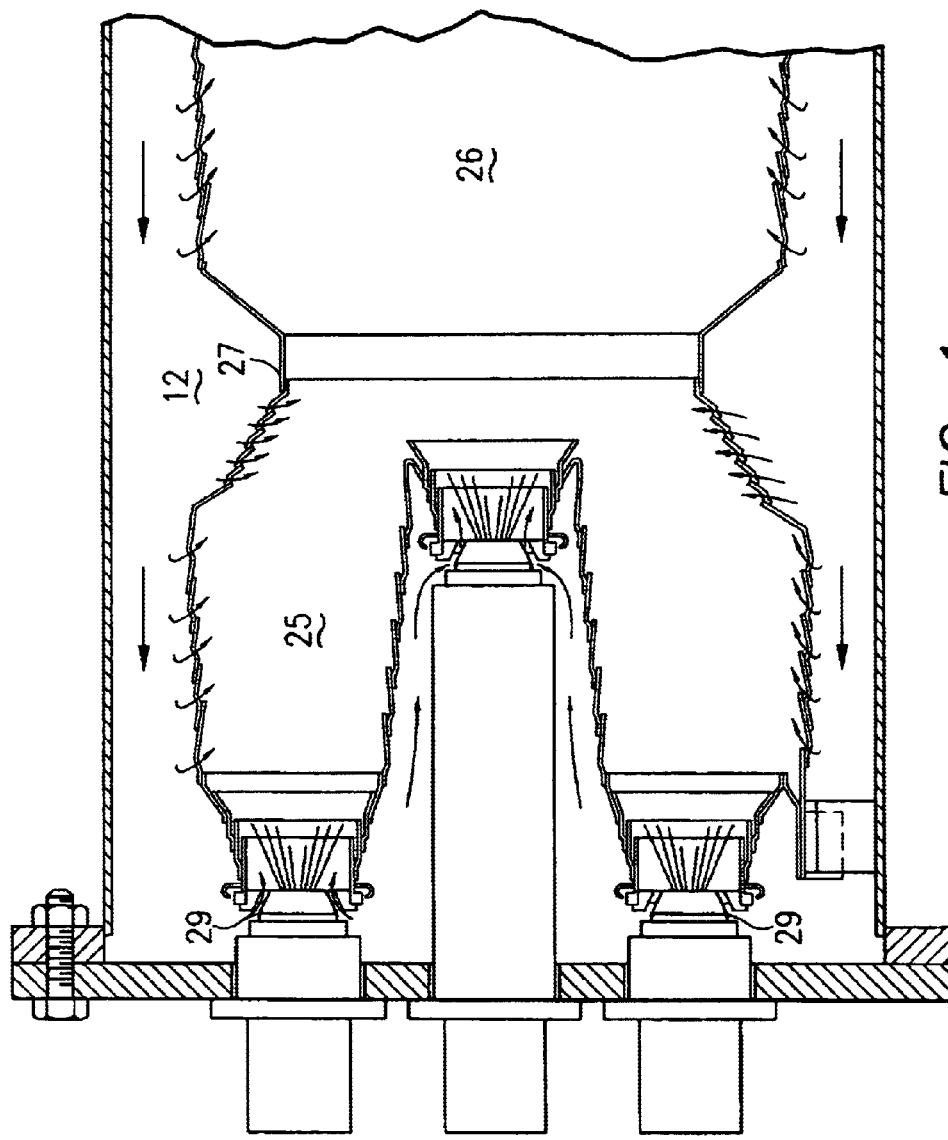
FIG. 1 is a cross section view of a dual stage dual mode gas turbine combustor of the prior art.
Figure 2:
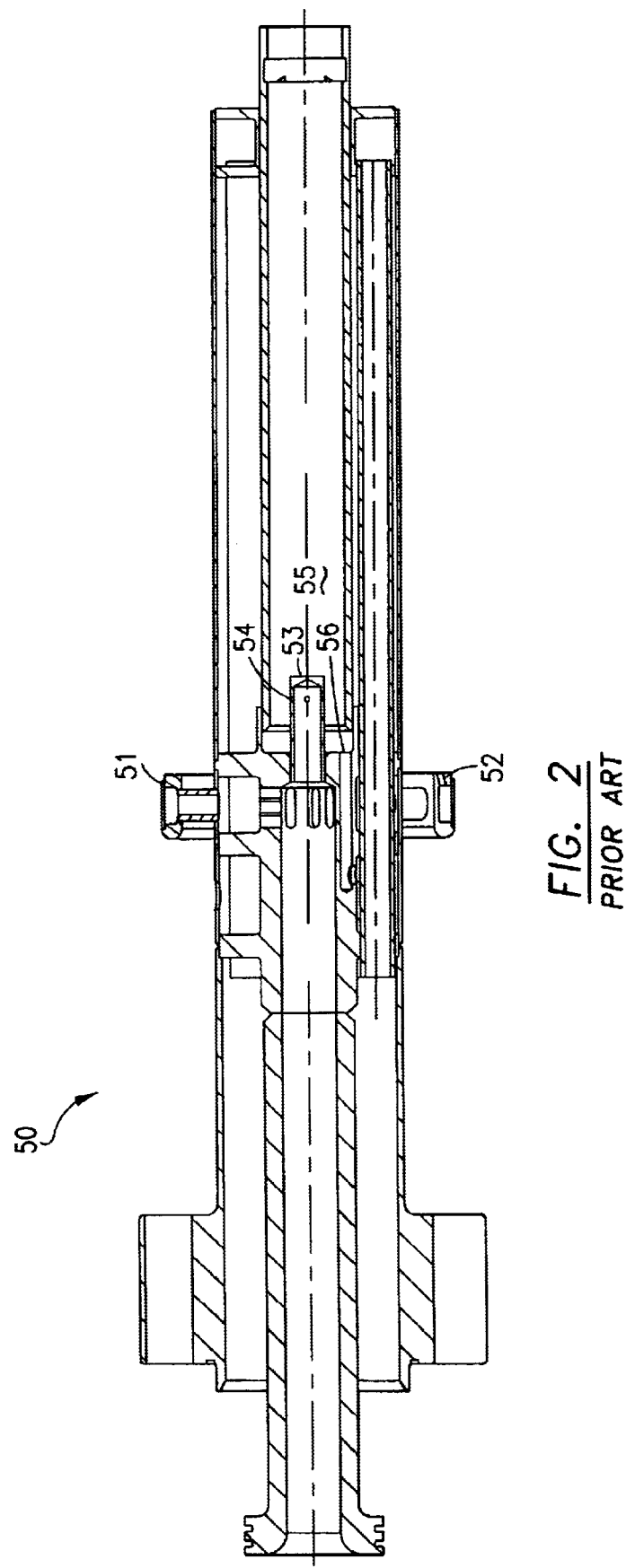
FIG. 2 is a cross section view of a fuel nozzle of the prior art.
Figure 3:
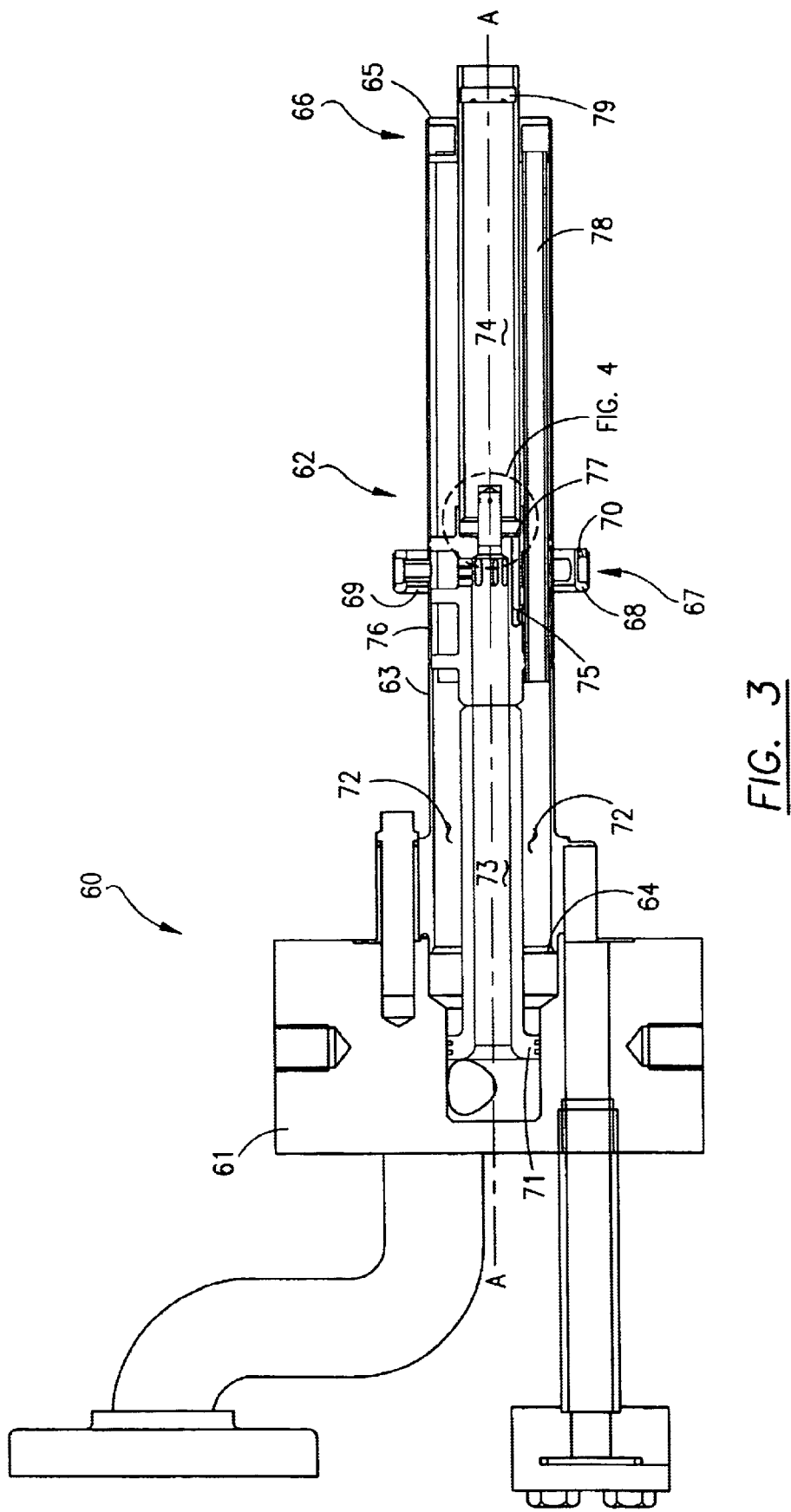
FIG. 3 is a cross section view of the present invention.

The present invention, an improved secondary fuel distribution system having an annular premix nozzle and a separate premix pilot nozzle with means for fuel flow rate adjustment, is disclosed and shown in detail in FIGS. 3–5b.

The improved fuel distribution system 60 comprises a housing 61 for receiving fuel from a supply source and delivering it to a secondary fuel nozzle assembly 62, which is attached to housing 61. Secondary fuel nozzle assembly 62 comprises an elongated tube 63 having a first end 64, an opposing second end 65, and a centerline A—A defined therethrough as well as a nozzle tip region 66 located proximate elongated tube second end 65. Furthermore, secondary fuel nozzle assembly 62 also contains a premix fuel nozzle 67 comprising an annular tubular manifold 68 circumferentially disposed around elongated tube 63 by a set of support members 69 which are fixed to and extend radially outwards from elongated tube 63. Annular tubular manifold 68 is in fluid communication with support members 69 and has a plurality of first holes 70 situated about its periphery and facing in a downstream direction, towards second end 65, for dispersing fuel wherein at least one first hole 70 is offset circumferentially from a support member 69. In operation, compressed air passes outside of elongated tube 63 and around premix fuel nozzle 67 such that fuel injected through first holes 70 mixes with the compressed air to form a fuel/air mixture.

Secondary fuel nozzle assembly 62 further includes a central core 71 coaxial to centerline A—A and located radially within elongated tube 63 such that a first passage 72 is formed between central core 71 and elongated tube 63 and extends from proximate first opposing end 64 of elongated tube 63 to second opposing end 65. Contained within central core 71 is a second passage 73, which extends from proximate first opposing end 64 of elongated tube 63 to premix fuel nozzle 67 and serves to supply fuel to at least premix fuel nozzle 67. Central core 71 also contains a third passage 74, which extends from downstream of premix fuel nozzle 67 to proximate second opposing end 65 and includes a swirler 79 for inducing a swirl to the fluids passing through third passage 74 prior to injection into a combustor. Furthermore, central core 71 contains a plurality of air flow channels 75 which are in fluid communication with third passage 74 and are arranged in an annular array about centerline A—A. Compressed air is drawn in to air flow channels 75 from outside secondary fuel nozzle assembly 62 through air flow inlet regions 76 and exits channels 75 into third passage 74 at exit regions 77. Due to the geometry of air flow passages 75, first passage 72 extends from proximate first opposing end 64 to proximate air flow inlet region 76.

Secondary fuel nozzle assembly 62 also contains a means for transferring fuel from first passage 72 to nozzle tip region 66. In the preferred embodiment, this is accomplished by a plurality of tubes 78 arranged in an annular array about centerline A—A, radially between central core 71 and elongated tube 63. Tubes 80 extend axially from first passage 72 to nozzle tip region 66.

Figure 4:
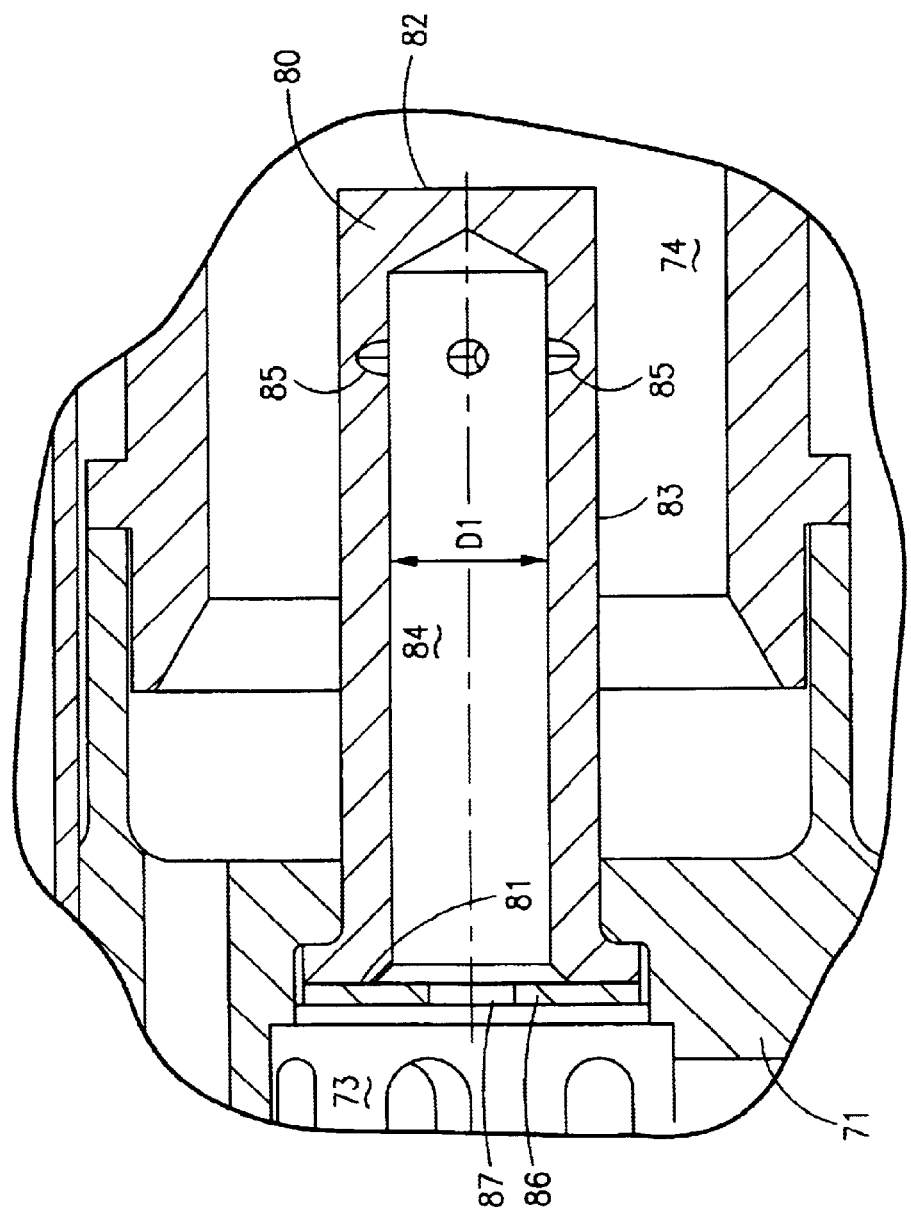
FIG. 4 is a detailed cross section view of the preferred embodiment of the present invention.

Referring now to FIG. 4, a further component of secondary fuel nozzle assembly 62 is a premix pilot nozzle 80 that is fixed to central core 71 at an axial position proximate premix fuel nozzle 67 such that premix pilot nozzle 80 is positioned within third passage 74 and coaxial to centerline A—A. Premix pilot nozzle 80 has a first end 81, an opposing second end 82, an outer surface 83, and an internal passage 84 in fluid communication with second passage 73, and is preferably circular in cross section such that internal passage 84 has a passage diameter D1. One skilled in the art of fuel nozzle design will understand that although this cross section is the preferred embodiment, other cross sectional shapes maybe necessary depending on fuel nozzle assembly structure, operation, and flow requirements. Located proximate second end 82 are a plurality of second holes 85, typically having a common diameter or effective flow area, for dispersing fuel to third passage 74. The improvement comprises the addition of a plate 86 that has at least one feed hole 87 for regulating fuel flow rate to premix pilot nozzle 80. Plate 86 is typically fixed to premix pilot nozzle 80 by a means such as brazing or welding such that the plate does not come loose during operation. In order to regulate the amount of fuel flow to premix pilot nozzle 80 at first end 81, after secondary fuel nozzle assembly 62 has been manufactured, a feed hole 87 is drilled in plate 86. This will allow completed fuel nozzle assemblies to be prepared with the exception of determining the size of feed hole 87. By utilizing a common size or flow rate for second holes 85, overall effective flow rate for premix pilot nozzle 80 can be regulated by plate 86 and feed hole 87. More specifically, it is desired that feed hole 87 is sized such that it has a greater effective flow area than the combined effective flow area of second holes 85. As a result, feed hole 87 while restricting the fuel flow to premix pilot nozzle 80, will maintain a higher fuel pressure in second passage 73 than the fuel pressure in internal passage 84.

Figure 5A:
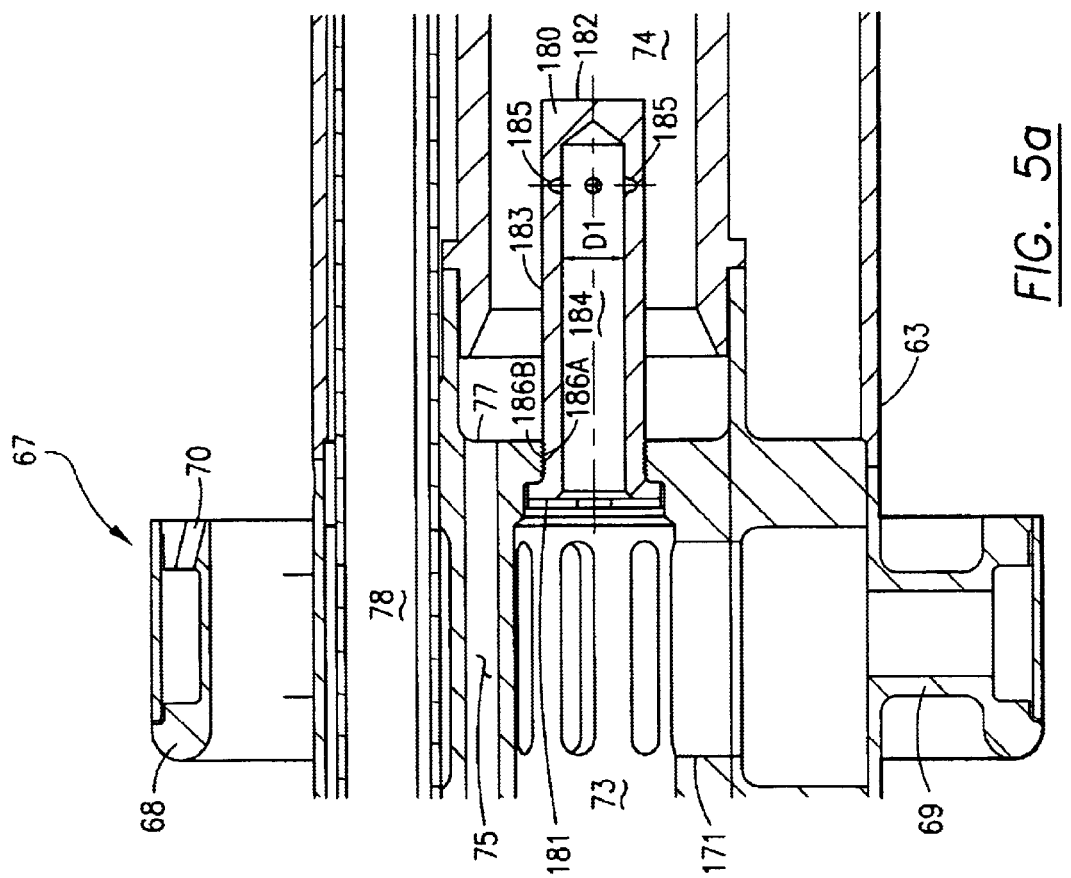
FIG. 5a is a detailed cross section view of a first alternate embodiment of the present invention.
Figure 5B:
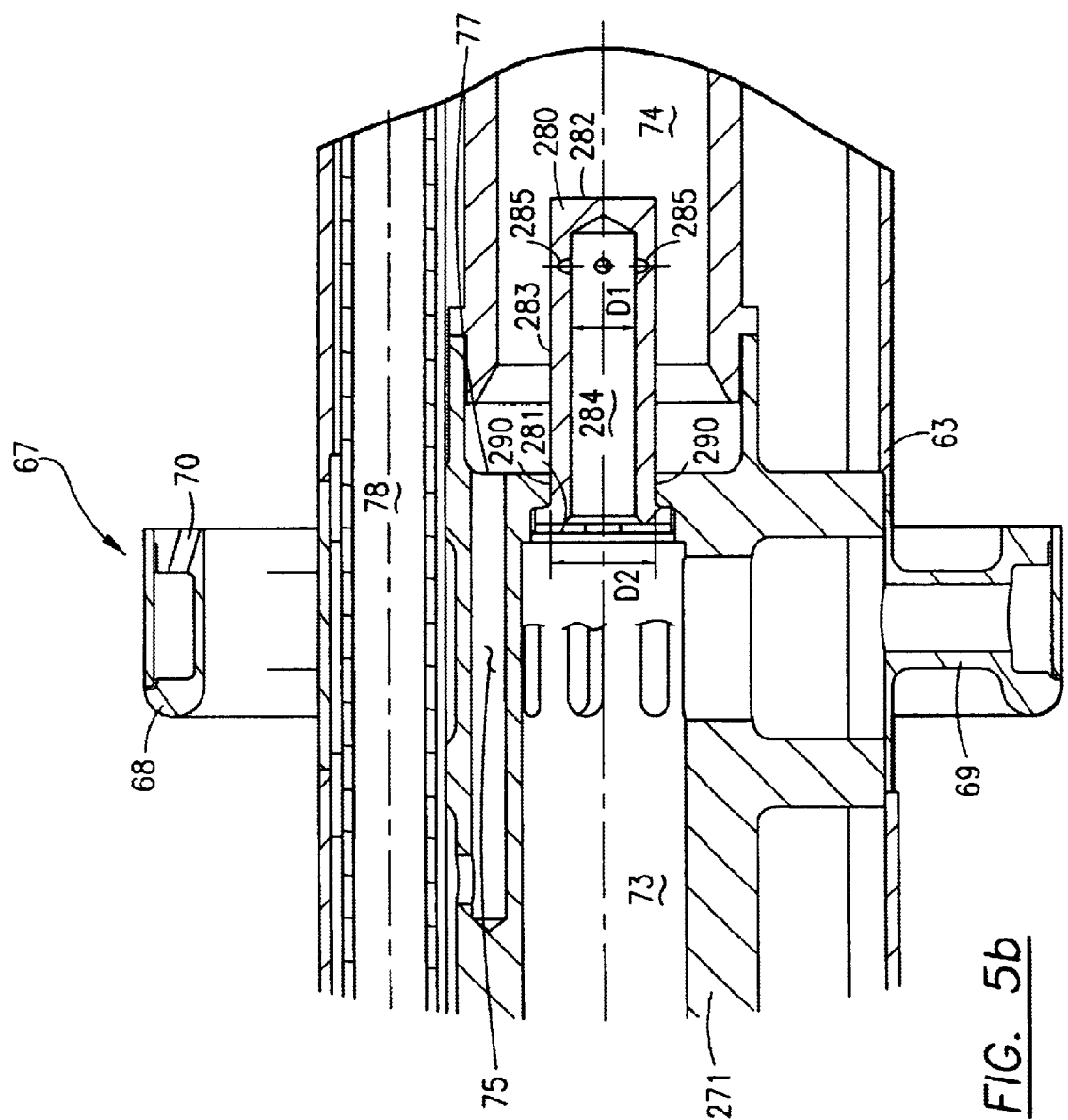
FIG. 5b is a detailed cross section view of a second alternate embodiment of the present invention.

Referring now to FIGS. 5a and 5b, alternate embodiments of the present invention are shown in detail cross sections. In each of the alternate embodiments, the present invention is identical in all aspects except for the premix pilot nozzle interface with the central core. In the first alternate embodiment and shown in FIG. 5a, premix pilot nozzle 180 has a first end 181, a second opposing end 182, an outer surface 183, and an internal passage 184 that is in fluid communication with second passage 73 and is preferably circular in cross section such that internal passage 184 has a passage diameter D1. Premix pilot nozzle 180 has a plurality of second holes 185 proximate second end 182 for dispersing fuel to third passage 74. Unlike the preferred embodiment of the present invention, premix pilot nozzle 180 is removable from secondary fuel nozzle assembly 62, due to the addition of mating threads 186A and 186B. Threads 186A are integral to outer surface 183 of premix pilot nozzle 180 and located proximate first opposing end 181. Threads 186A engage corresponding threads 186B that are integral to central core 171, which are located proximate second passage 73, thereby fixing premix pilot nozzle 180 to central core 171 such that internal passage 184 is in fluid communication with second passage 73 and therefore fuel discharging from second holes 185 is directed into third passage 74 to mix with air from air flow channels 75. In this first alternate embodiment, second holes 185 can be machined into premix pilot nozzle 180 after secondary fuel nozzle assembly 62 is manufactured and then premix pilot nozzle 180 can be installed in secondary fuel nozzle assembly 62. Alternatively, due to corresponding threads 186A and 186B, premix pilot nozzle 180 can be removed, second holes 185 adjusted, or premix pilot nozzle 180 replaced with an alternate configuration. As a result of premix pilot nozzle 180 having the capability of being removed and second holes 185 machined later and to a custom size, plate 86 with feed hole 87 of the preferred embodiment would no longer be necessary.

In a second alternate embodiment shown in FIG. 5b, a premix pilot nozzle 280 has a first end 281, a second opposing end 282, an outer surface 283, and an internal passage 284 that is in fluid communication with second passage 73 and is preferably circular in cross section such that internal passage 284 has a passage diameter D1. Premix pilot nozzle 280 has a plurality of second holes 285 proximate second end 282 for dispersing fuel to third passage 74.

Unlike the preferred embodiment of the present invention, premix pilot nozzle 280 may be installed in secondary fuel nozzle assembly 62 after manufacturing, due to a pressfit feature between premix pilot nozzle 280 and central core 271. In this second alternate embodiment, premix pilot nozzle 280 is pressed into central core 271 along region 290, such that diameter D2 of premix pilot nozzle 280 causes an interference fit along region 290 of central core 271. In this second alternate embodiment, since premix pilot nozzle 280 can be installed after secondary fuel nozzle assembly 62 is manufactured, second holes 285 can be machined in premix pilot nozzle 280 at a later time allowing second holes 285 to be machined to a desired size and flow rate. As a result, plate 86 with feed hole 87 of the preferred embodiment would no longer be necessary.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. A method of providing a secondary fuel distribution system having an annular premix nozzle and a separate premix pilot nozzle with a means to adjust and fine tune a fuel flow through said premix pilot nozzle, said method comprising the steps:

providing a housing for receiving fuel from a supply source and delivering fuel to a secondary fuel nozzle assembly which is attached to said housing, said secondary fuel nozzle assembly comprising:

an elongated tube having opposing first and second ends and having a centerline defined therethrough;

a nozzle tip region located proximate said elongated tube second end;

a premix fuel nozzle comprising an annular tubular manifold circumferentially disposed around said elongated tube by a set of support members which are fixed to an extend radially outwards from said elongated tube, said manifold in fluid communication with said support members and having a plurality of first holes situated about its periphery facing in a downstream direction for dispersing fuel to a combustor, such that said fuel mixes with air passing around said manifold, wherein at least one of said first holes is offset circumferentially from said support member;

a central core coaxial with said centerline and located radially within said elongated tube thereby forming a first passage between said central core and said elongated tube, said central core extending from proximate said elongated tube first opposing end to said second opposing end, said central core containing a second passage extending from proximate said elongated tube first opposing end to proximate said premix fuel nozzle for supplying fuel to said premix fuel nozzle, said central core also containing a third passage extending from downstream of said premix fuel nozzle to proximate said second opposing end each of said second and third passages are coaxial with said centerline, said central core further containing a plurality of air flow channels in fluid communication with said third passage and arranged in an annular array about said centerline, said air flow channels having an air flow inlet region and air flow exit region, and said first passage extending from proximate said first opposing end to upstream of said air flow inlet region of said air flow channels;

means for transferring fuel from said first passage to said nozzle tip region;

a premix pilot nozzle fixed to said central core at an axial position proximate said premix fuel nozzle such that said pilot nozzle is positioned within said third passage and coaxial with said centerline, said premix pilot nozzle having opposing first and second ends, an outer surface, and an internal passage, said pilot nozzle having a plurality of second holes proximate said pilot nozzle second end for dispersing fuel to said third passage, and a plate fixed to said first end of said premix pilot nozzle;

determining a desired fuel flow rate for said premix pilot nozzle; and, placing at least one feed hole in said plate such that said internal passage is in fluid communication with said second passage and said at least one feed hole can be sized to match said desired fuel flow rate.

2. The method of claim 1 wherein said plate is brazed to said premix pilot nozzle.

3. The method of claim 1 wherein said plate is welded to said premix pilot nozzle.

4. The method of claim 1 wherein said at least one feed hole has an effective flow area greater than the combined effective flow area of said second holes in said premix pilot nozzle.

5. The method of claim 1 wherein said premix pilot nozzle is of circular cross section and said internal passage has a passage diameter.

6. The method of claim 1 wherein said at least one feed hole of said plate restricts the flow of fuel to said premix pilot nozzle such that the pressure of fuel in said second passage is higher than the fuel pressure in said internal passage of said premix pilot fuel nozzle.

7. The method of claim 1 wherein said secondary fuel nozzle assembly further comprises a swirler positioned proximate said nozzle tip region of said third passage.

8. The method of claim 1 wherein said means for transferring fuel from said first passage to said nozzle tip region comprises a plurality of tubes arranged in an annular array about said centerline, radially between said central core and said elongated tube, and extending from said first passage to said nozzle tip region.

* * * * *